US011574035B2

(12) United States Patent
Singh et al.

(10) Patent No.: US 11,574,035 B2
(45) Date of Patent: Feb. 7, 2023

(54) SYSTEMS AND METHODS FOR OPTIMIZING VOICE VERIFICATION FROM MULTIPLE SOURCES AGAINST A COMMON VOICEPRINT

(71) Applicant: FMR LLC, Boston, MA (US)

(72) Inventors: Harmeet Singh, Brattleboro, VT (US); Robert Gage, Bonita Springs, FL (US); David Marteney, Harvard, MA (US); Kevin Johnson, Northborough, MA (US)

(73) Assignee: FMR LLC, Boston, MA (US)

( * ) Notice: Subject to any disclaimer, the term of this patent is extended or adjusted under 35 U.S.C. 154(b) by 116 days.

(21) Appl. No.: 16/779,140

(22) Filed: Jan. 31, 2020

(65) Prior Publication Data

US 2020/0250287 A1 Aug. 6, 2020

Related U.S. Application Data

(60) Provisional application No. 62/800,537, filed on Feb. 3, 2019.

(51) Int. Cl.
*H04M 3/00* (2006.01)
*H04M 5/00* (2006.01)
(Continued)

(52) U.S. Cl.
CPC ........ *G06F 21/32* (2013.01); *G06F 16/24522* (2019.01); *G06F 16/3329* (2019.01);
(Continued)

(58) Field of Classification Search
CPC ......... G10L 15/22; G10L 15/30; G10L 17/22; G10L 15/1815; G10L 17/00; G10L 17/24; G10L 25/48; G10L 2015/088; G10L 2015/227; G10L 15/00; G10L 15/1822; G06F 3/167; G06F 21/32; G06F 16/90332; G06F 16/48; H04L 67/303;
(Continued)

(56) References Cited

U.S. PATENT DOCUMENTS 5,414,755 A 5/1995 Bahler et al.
6,788,770 B1 * 9/2004 Cook .................. H04L 12/2854
379/100.01
(Continued)

*Primary Examiner* — Kharye Pope
(74) *Attorney, Agent, or Firm* — Cesari & McKenna, LLP

(57) ABSTRACT

Systems and methods for authenticating a user using a voice activated device. The method includes receiving first data representing a user identifier corresponding to a user and second data representing a device identifier corresponding to the voice activated device. The method further includes determining user metadata corresponding to the user identifier and a device audio type corresponding to the device identifier. The method also includes calculating a risk score based on the user metadata. The method further includes calculating a length of spoken voice utterance based on the calculated risk score. The method also includes receiving and processing third data representing a spoken voice utterance having the calculated length corresponding to the user using the voice activated device. The method further includes validating the user in response to determining that the processed third data substantially matches the voiceprint associated with the user.

21 Claims, 11 Drawing Sheets

(51) Int. Cl.
*H04L 12/66* (2006.01)
*G06F 21/32* (2013.01)
*H04L 9/32* (2006.01)
*G10L 15/18* (2013.01)
*H04M 3/493* (2006.01)
*G06F 16/2452* (2019.01)
*G06F 16/332* (2019.01)
*H04M 3/42* (2006.01)

(52) U.S. Cl.
CPC ........ *G10L 15/1822* (2013.01); *H04L 9/3213* (2013.01); *H04L 9/3231* (2013.01); *H04L 9/3263* (2013.01); *H04M 3/42059* (2013.01); *H04M 3/4936* (2013.01); *H04M 2203/6054* (2013.01); *H04M 2250/74* (2013.01)

(58) Field of Classification Search
CPC . H04L 63/0861; H04L 63/107; H04L 67/306; H04L 51/046; H04M 1/271; H04M 1/66; H04M 1/72463; H04M 2201/41; H04M 2250/74; H04M 3/42068; H04M 2201/40; H04M 3/5175; H04M 3/5183; H04W 12/06; H04W 12/37
See application file for complete search history.

(56) References Cited

U.S. PATENT DOCUMENTS

| | | | |
|---|---|---|---|
| 7,054,811 B2 | 5/2006 | Barzilay | |
| 9,928,839 B1* | 3/2018 | Lester | H04L 63/105 |
| 10,210,685 B2 | 2/2019 | Borgmeyer | |
| 10,482,453 B2 | 11/2019 | Zarakas et al. | |
| 10,867,612 B1* | 12/2020 | Pollack | G06K 9/00892 |
| 2004/0162726 A1* | 8/2004 | Chang | G10L 17/04 704/247 |
| 2004/0193403 A1* | 9/2004 | Creamer | G10L 15/1815 704/201 |
| 2005/0097320 A1* | 5/2005 | Golan | G06F 21/40 713/166 |
| 2006/0277043 A1* | 12/2006 | Tomes | G10L 17/24 704/E17.016 |
| 2010/0228656 A1* | 9/2010 | Wasserblat | G06Q 40/00 705/35 |
| 2013/0232073 A1* | 9/2013 | Sheets | H04L 9/3231 705/44 |
| 2013/0311190 A1* | 11/2013 | Reiner | G06Q 10/0639 704/270 |
| 2014/0254778 A1* | 9/2014 | Zeppenfeld | H04M 3/523 379/88.02 |
| 2014/0379340 A1* | 12/2014 | Timem | H04L 63/102 704/246 |
| 2014/0379525 A1* | 12/2014 | Timem | G06Q 20/3227 705/26.41 |
| 2015/0187359 A1* | 7/2015 | Bhaskaran | G10L 17/08 704/235 |
| 2017/0194004 A1* | 7/2017 | Lousky | G10L 17/04 |
| 2018/0198841 A1* | 7/2018 | Chmielewski | H04L 12/2818 |
| 2018/0308487 A1* | 10/2018 | Goel | G10L 15/26 |
| 2020/0117781 A1* | 4/2020 | Korus | G06N 20/00 |

* cited by examiner

SYSTEMS AND METHODS FOR OPTIMIZING VOICE VERIFICATION FROM MULTIPLE SOURCES AGAINST A COMMON VOICEPRINT

CROSS REFERENCE TO RELATED APPLICATION

This application claims the benefit of an priority to U.S. Provisional Patent Application No. 62/800,537, filed Feb. 3, 2019, the entire contents of which are owned by the assignee of the instant application and incorporated herein by reference in their entirety.

FIELD OF THE INVENTION

The present invention relates generally to systems and methods for authenticating users of interactive voice response applications over communication networks, including systems and methods for authenticating a caller using a voice activated device over communication networks.

BACKGROUND OF THE INVENTION

The contact centers of many service organizations employ some form of interactive voice response ("IVR") technology for providing an automated interface between human callers and the information stored on the organization's back-end systems. For example, IVR systems can implement certain self service capabilities, allowing callers to access commonly-requested information such as account balance and payment history without requiring assistance from a live agent. Advanced IVR systems can allow callers to conduct more complex transactions such as paying bills, updating account information, or executing trades.

IVR technology can also be used at the front end of more traditional call centers where interactions with callers are exclusively over phone/voice channels. For example, IVR technology can be used at the beginning of a call to gather certain identifying information about the caller and the purpose for the call. This information can be used to direct the call to the live agent best able to service the caller's request.

IVR systems most commonly use DTMF decoding in conjunction with a voice biometric application for interpreting a caller's response to prerecorded menu prompts. For example, DTMF decoding applications can interpret touch-tone keypad selections made by the caller, while speech recognition software allows specific words or phrases spoken by the caller to direct the interaction with the IVR system.

DTMF decoding and voice biometrics can also be used for authenticating a caller's identity during an interaction with a contact center. For example, identifying information such as the caller's account number, user name, and password can be entered via a combination of touch-tone keypresses and spoken words or phrases can be recognized and verified by speech recognition software.

In some embodiments, a caller has previously completed an enrollment process by which one or more voiceprints unique to the caller are generated based on recordings of the caller's spoken responses to a series of prompts. In such cases, a contact center caller can be authenticated based on a comparison of a spoken verification phase against one or more previously-created voiceprints. In some embodiments, the verification phrase is one of the phrases the caller spoke during the enrollment process. In some embodiments, the verification phrase is one the caller has not been recorded speaking, and the comparison is based on similarities in aspects of the caller's voice and manner of speaking to aspects of the one or more voiceprints. In some embodiments, the caller is authenticated by comparing the caller's pre-established voiceprints to samples of the caller's voice captured passively when the caller responds to menu navigation prompts from the IVR system, or during conversations with a live agent.

With the recent proliferation and variety of available cloud-based services, many of an organization's in-house applications and systems utilize one or more cloud-based applications developed and administered by third parties. This is often a more time- and cost-effective means for an organization to get its own products to market and to maintain its products over time. As one example, using this model, a financial services organization can primarily focus on development of its core market analysis and advising products without having to develop and maintain applications for administrative tasks such as authenticating users and determining caller intent during a phone call. These types of administrative tasks can be handled by cloud-based services that communicate to the organization's own systems and applications using predefined APIs.

While utilizing cloud-based services can provide several benefits, a common concern for organizations is that utilizing cloud-based services, by nature, requires that sensitive information about the organization and its users/members must regularly be passed over the Internet between the organization's systems and cloud computing systems. Accordingly, there is a need for a technology capable of overcoming the risks discussed above related to passing personally-identifying and other sensitive information between an organization and a cloud-based service.

SUMMARY OF THE INVENTION

Accordingly, an object of the invention is to provide network administrators with systems and methods for transmitting personally-identifying and other sensitive information between an organization and a cloud-based service. It is an object of the invention to provide network administrators with systems and methods for authenticating a registered user using a voice activated device over communication networks. It is an object of the invention to provide network administrators with systems and methods for authenticating a registered user using an application capable of collecting and transmitting microphone collected audio.

In some aspects, a method for authenticating a registered user using a voice activated device includes receiving, by a server computing device, first data representing a user identifier corresponding to a registered user and second data representing a device identifier corresponding to a voice activated device. The method further includes determining, by the server computing device, user metadata corresponding to the user identifier and a device audio type corresponding to the device identifier. The method also includes calculating, by the server computing device, a risk score based on the user metadata corresponding to the user identifier. Further, the method includes calculating, by the server computing device, a length of spoken voice utterance based on the calculated risk score. The method also includes receiving, by the server computing device, third data representing a spoken voice utterance having the calculated length corresponding to the registered user using the voice activated device. The method further includes processing, by the server computing device, the third data representing the spoken voice utterance based on the device audio type. Further, the method includes comparing, by the server computing device, the processed third data representing the spoken voice utterance and a voiceprint associated with the registered user. The method also includes validating, by the server computing device, the registered user in response to determining that the processed third data representing the spoken voice utterance substantially matches the voiceprint associated with the registered user.

In some embodiments, the voice activated device includes one of a smartphone, a tablet, a laptop, a personal computer, or a voice assistant device. In other embodiments, the server computing device is further configured to receive a user location from the voice activated device. In some embodiments, the server computing device is further configured to calculate the risk score based on the user location.

In other embodiments, the user metadata includes at least one of a user speaking style, a user intention, or user historical data. In some embodiments, the spoken voice utterance includes a user intention. For example, in some embodiments, the server computing device is further configured to determine an experience flow based on the user intention. In other embodiments, the voiceprint associated with the registered user corresponds to previously generated spoken voice utterances.

In some embodiments, the server computing device is further configured to generate a security token in response to determining that the processed third data representing the spoken voice utterance substantially matches the at least one voiceprint associated with the registered user, and encrypt the security token with a certificate.

In some aspects, a system for authenticating a registered user using a voice activated device includes a voice activated device communicatively coupled to a server computing device. The server computing device is configured to receive first data representing a user identifier corresponding to a registered user and second data representing a device identifier corresponding to the voice activated device. The server computing device is also configured to determine user metadata corresponding to the user identifier and a device audio type corresponding to the device identifier. Further, the server computing device is configured to calculate a risk score based on the user metadata corresponding to the user identifier. The server computing device is also configured to calculate a length of spoken voice utterance based on the calculated risk score. Further, the server computing device is configured to receive third data representing a spoken voice utterance having the calculated length corresponding to the registered user using the voice activated device. The server computing device is also configured to process the third data representing the spoken voice utterance based on the device audio type. The server computing device is also configured to compare the processed third data representing the spoken voice utterance and a voiceprint associated with the registered user. Further, the server computing device is configured to validate the registered user in response to determining that the processed third data representing the spoken voice utterance substantially matches the voiceprint associated with the registered user.

In some embodiments, the voice activated device includes one of a smartphone, a tablet, a laptop, a personal computer, or a voice assistant device. In other embodiments, the server computing device is further configured to receive a user location from the voice activated device. In some embodiments, the server computing device is further configured to calculate the risk score based on the user location.

In other embodiments, the user metadata includes at least one of a user speaking style, a user intention, or user historical data. In some embodiments, the spoken voice utterance includes a user intention. For example, in some embodiments, the server computing device is further configured to determine an experience flow based on the user intention. In other embodiments, the voiceprint associated with the registered user corresponds to previously generated spoken voice utterances.

In some embodiments, the server computing device is further configured to generate a security token in response to determining that the processed third data representing the spoken voice utterance substantially matches the at least one voiceprint associated with the registered user, and encrypt the security token with a certificate.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

The technology described herein is capable of overcoming the risks discussed above related to passing personally-identifying and other sensitive information between an organization and a cloud-based service. In one aspect, the technology implements a method for receiving a response from an IVR application including spoken utterance by a caller, tokenizing the response in a SAML assertion, and signing and encrypting it with a certificate. After being processed in this manner, even in the event a response was intercepted by a malicious third party outside of the organization, it could not be used to gain access to systems or services within the organization in its encrypted form.

Accordingly, the technology described herein used in conjunction with an organization's IVR application enables callers to be authenticated by answering questions in one of the organization's voice applications. The caller will then be allowed to carry out self service activities without having to enter a PIN or transfer to a live agent to be authenticated. This technology also implements a new way of using a voice biometric application that allows call center or voice channel callers to verify their identities with voiceprints that were previously created with a contact center associate by speaking utterances with a cloud or on premise voice capture solution.

Figure 1:
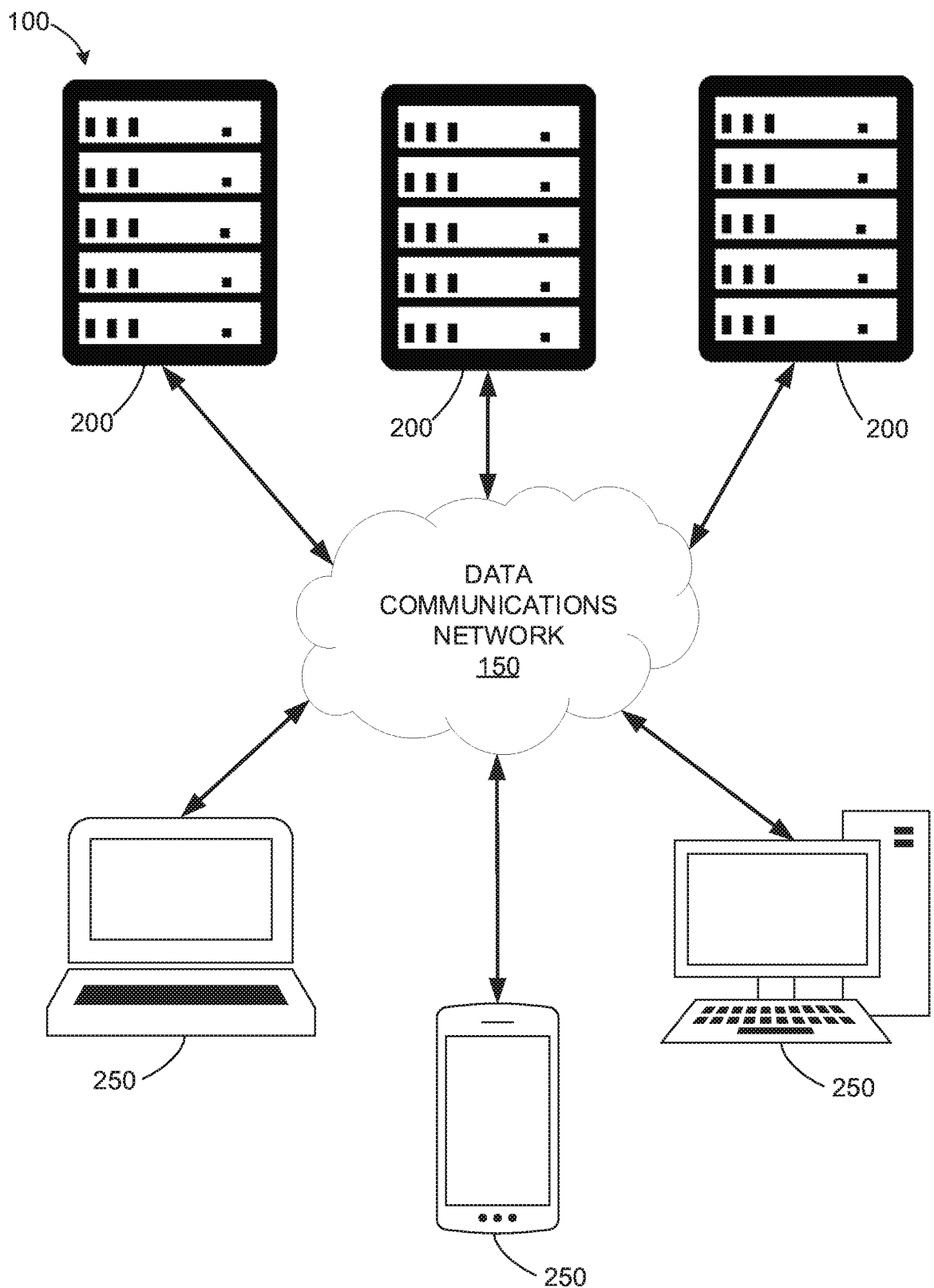
FIG. 1 is a block diagram of an exemplary data communications network according to embodiments of the technology described herein.
Figure 2:
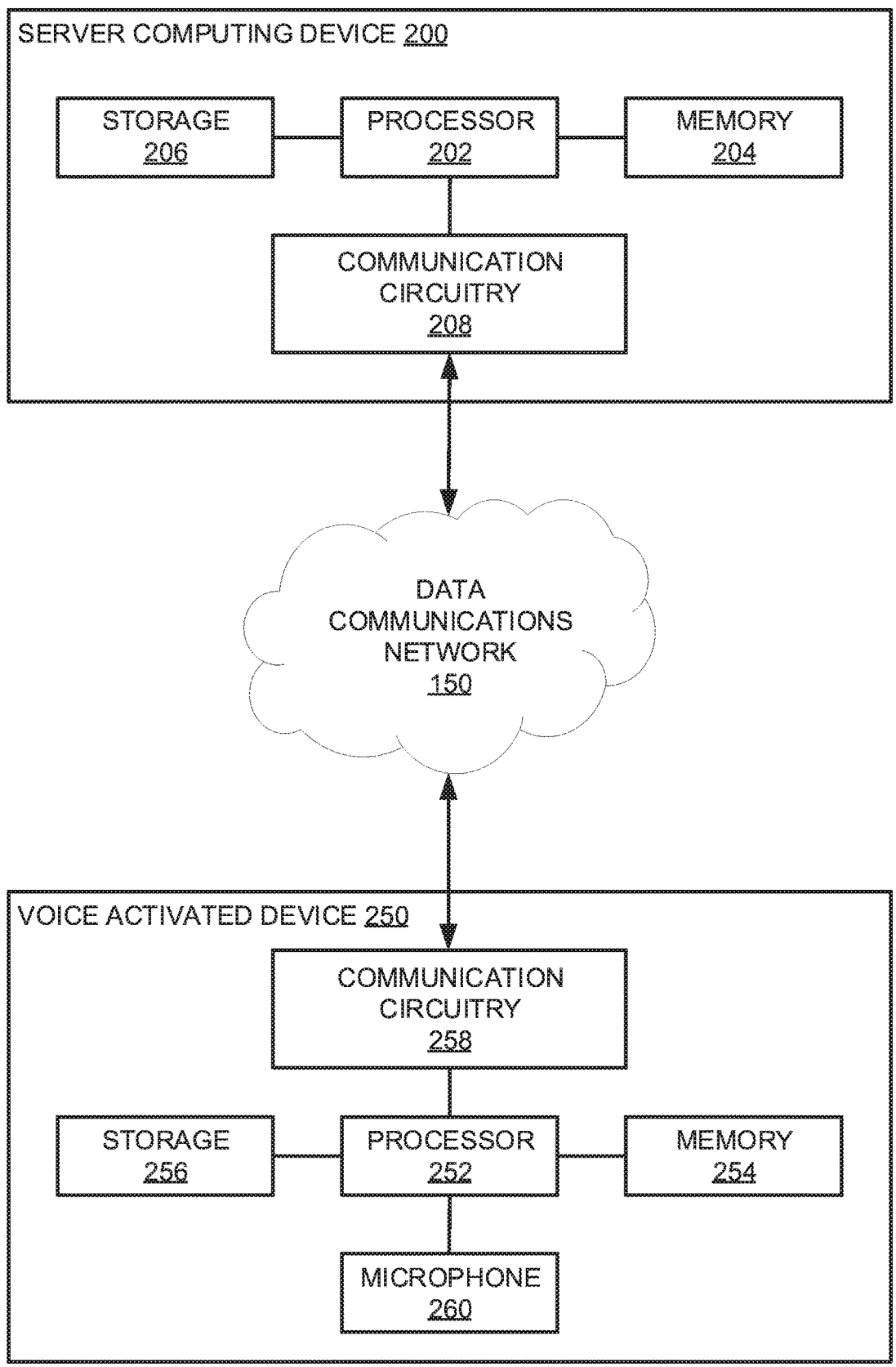
FIG. 2 is a block diagram of an exemplary server computing device and an exemplary voice activated device according to embodiments of the technology described herein.

Referring to FIGS. 1 and 2, an exemplary communications system 100 includes data communications network 150, exemplary server computing devices 200, and exemplary voice activated devices 250. In some embodiments, the system 100 includes one or more server computing devices 200 and one or more voice activated devices 250. Each server computing device 200 can include a processor 202, memory 204, storage 206, and communication circuitry 208. Each voice activated device 250 can include a processor 252, memory 254, storage 256, microphone 260, and communication circuitry 258. In some embodiments, communication circuitry 208 of the server computing devices 200 is communicatively coupled to the communication circuitry 258 of the voice activated devices 250 via data communications network 150. Communication circuitry 208 and communication circuitry 258 can use Bluetooth, Wi-Fi, or any comparable data transfer connection. The voice activated devices 250 can include smartphones, personal workstations, laptops, tablets, mobile devices, or any other comparable device.

Figure 3:
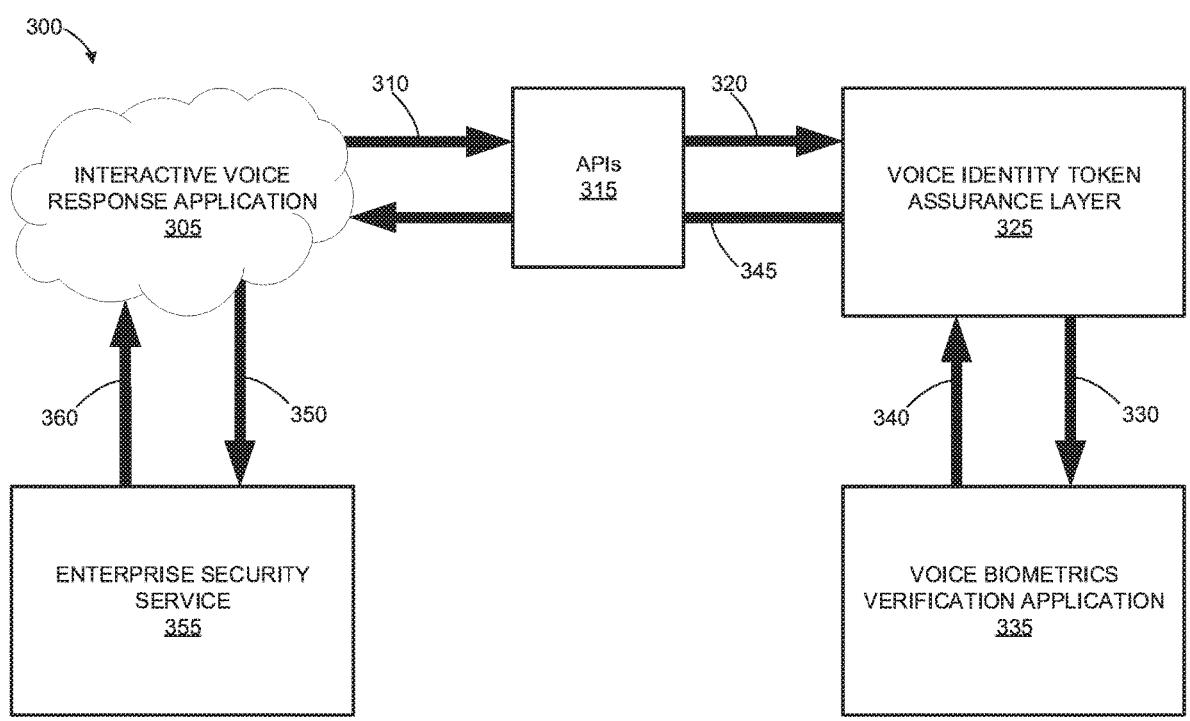
FIG. 3 is a diagram demonstrating an exemplary process flow for authenticating a user over the exemplary data communications network shown in FIG. 1, according to embodiments of the technology described herein.

FIG. 3 is a diagram 300 demonstrating an exemplary process flow according to the technology described herein. Initially, a caller's spoken voice utterances of intent for the call are gathered by Interactive Voice Response application 305 (hereinafter "IVR 305"). As shown, IVR 305 can be implemented as a cloud-based IVR application. In some embodiments, IVR 305 is a Natural Language Understanding application.

The caller's voice utterances are passed (310) from IVR 305 to the organization's APIs 315, and passed (320) internally within the organization for processing by Voice Identity Token Assurance Layer 325 (herein after "VITAL 325"). VITAL 325 passes (330) processed audio from the caller's voice utterances to Voice Biometrics Verification application 335 (hereinafter "VBV 335") for a verification decision on whether the caller's voice utterances substantially match based on a comparison with one or more voiceprints associated with the caller. In some embodiments, VBV 335 is one or more on-premises systems of the organization. In some embodiments, VBV 335 is a cloud-based application.

VBV 335 passes (340) an XML verification response back to VITAL 325, which is configured to generate a SAML security token based on an affirmative verification decision. For example, VITAL 325 tokenizes the response in a SAML assertion, and signs and encrypts it with a certificate. VITAL 325 passes (345) the SAML security token back to IVR 305 which in turn passes (350) the SAML security token into the organization's enterprise security service 355 (hereinafter "ESS 355"). ESS 355 decrypts the SAML security token and validates it. ESS 355 then updates the customer credential to be authenticated which it passes (360) back to IVR 305.

Figure 4:
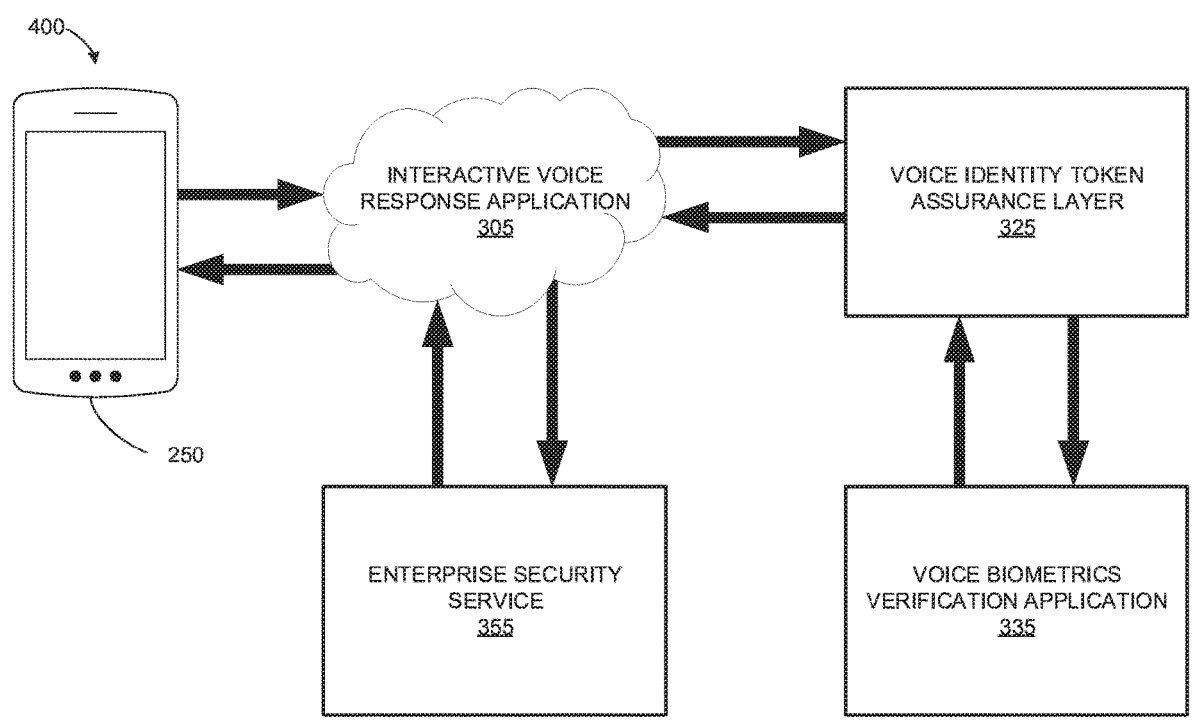
FIG. 4 is a block diagram of an exemplary system for authenticating a user over the exemplary data communications network shown in FIG. 1, according to embodiments of the technology described herein.

FIG. 4 is a block diagram of an exemplary system 400 for authenticating a user over the exemplary data communications network shown in FIG. 1. System 400 includes a voice activated device 250, an interactive voice response application 305, a voice identity token assurance layer 325, a voice biometrics verification application 335, and an enterprise security service 355. In some embodiments, the interactive voice response application 305, voice identity token assurance layer 325, voice biometrics verification application 335, and enterprise security service 355 are all implemented on one or more server computing devices 200.

The process begins with a user interacting with IVR 305 using the voice activated device 250. For example, the user can call an 800-number that is associated with the organization, but is terminated at a voice browser hosted by a cloud-based service provider. The voice browser bootstraps with application grammar and flow from the organization's Natural Language Understanding rules. A session level credential token is created, and the caller provides identify information which is passed to VITAL 325. VITAL 325 in turn calls the organization's VBV 335 to determine if one or more voiceprint have been registered to the caller, and if so, returns an indicator to IVR 305 to begin collecting voice utterances from the caller.

At this point the Session Credential Token authentication level is upgraded to User Identity Credential, and then IVR 305 begins collecting and sending samplings of the caller's voice utterances to the organization's API Integrator. In some embodiments, IVR 305 collects samplings of the caller's voice utterances using a microphone on the voice activated device 250. The API Integrator then passes the samplings to VITAL 325 on separate VITAL servers. VITAL 325 then passes audio to the organization's VBV 335 which verifies whether there is a match to the caller's previously-collected voiceprints.

If sufficient audio matches the caller's previously-collected voiceprints, VITAL 325 creates and returns a signed, encrypted SAML token, and the encrypted SAML token is returned to IVR 305 via the API Integrator to relay the call to the organization's enterprise security service 355. IVR 305 then calls the centralized authentication API with the SAML token and User Identity Credential token to be upgraded to authenticated strength. Finally, ESS 355 validates the SAML assertion and returns an upgraded user credential for use in self service operations facilitated by IVR 305.

Figure 5:
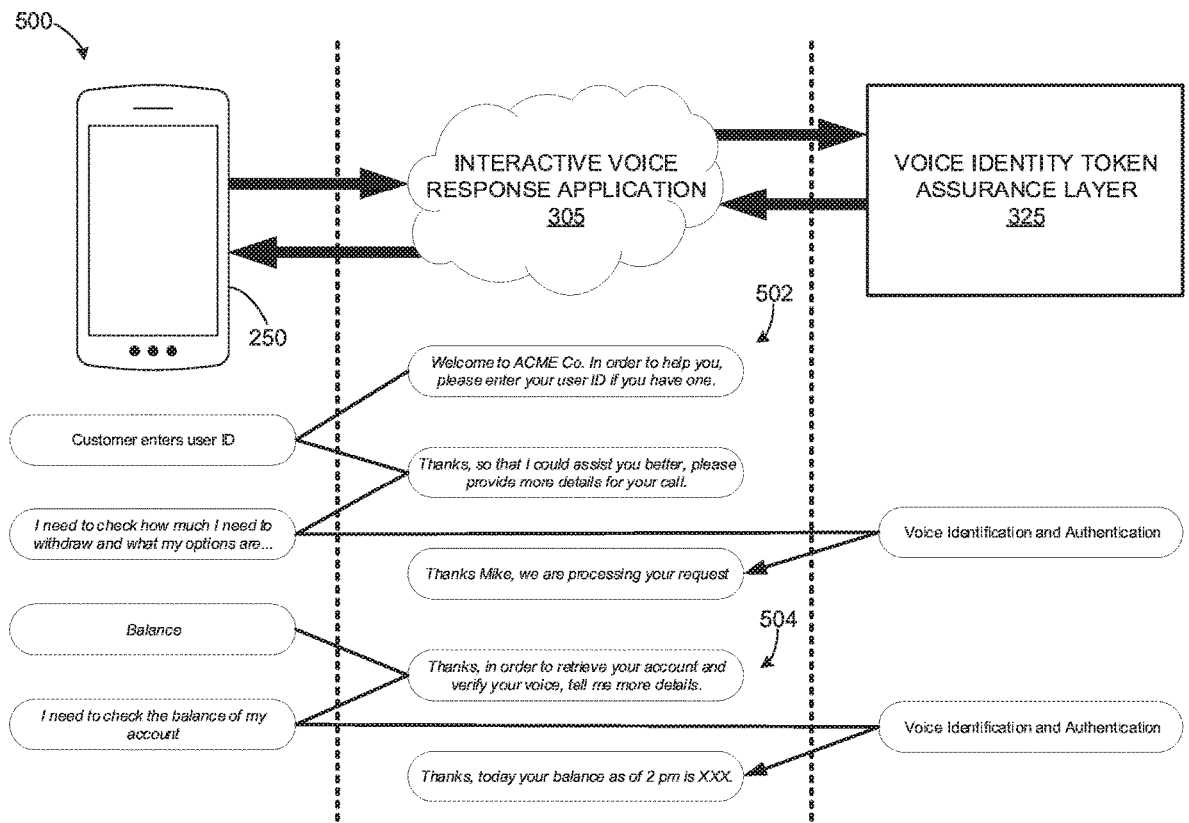
FIG. 5 is a diagram demonstrating an exemplary interaction between a registered user and an interactive voice response application, according to embodiments of the technology described herein.

FIG. 5 is a flow diagram 500 showing an exemplary interaction between a voice activated device 250, IVR 305, and VITAL 325, using exemplary system 400. Generally, use case 502 illustrates a use case for initial caller authentication to the IVR 305 where the caller provides sufficient audio to authenticate. Further, use case 504 illustrates a use case in which the customer intent voice utterance is too short to be verified. In this case, the caller is prompted to provide more details about the purpose for the call in order to collect additional audio which will aggregate with previous utterances to provide a sufficient sample that can ultimately be authenticated or proven a non-match.

Figure 6:
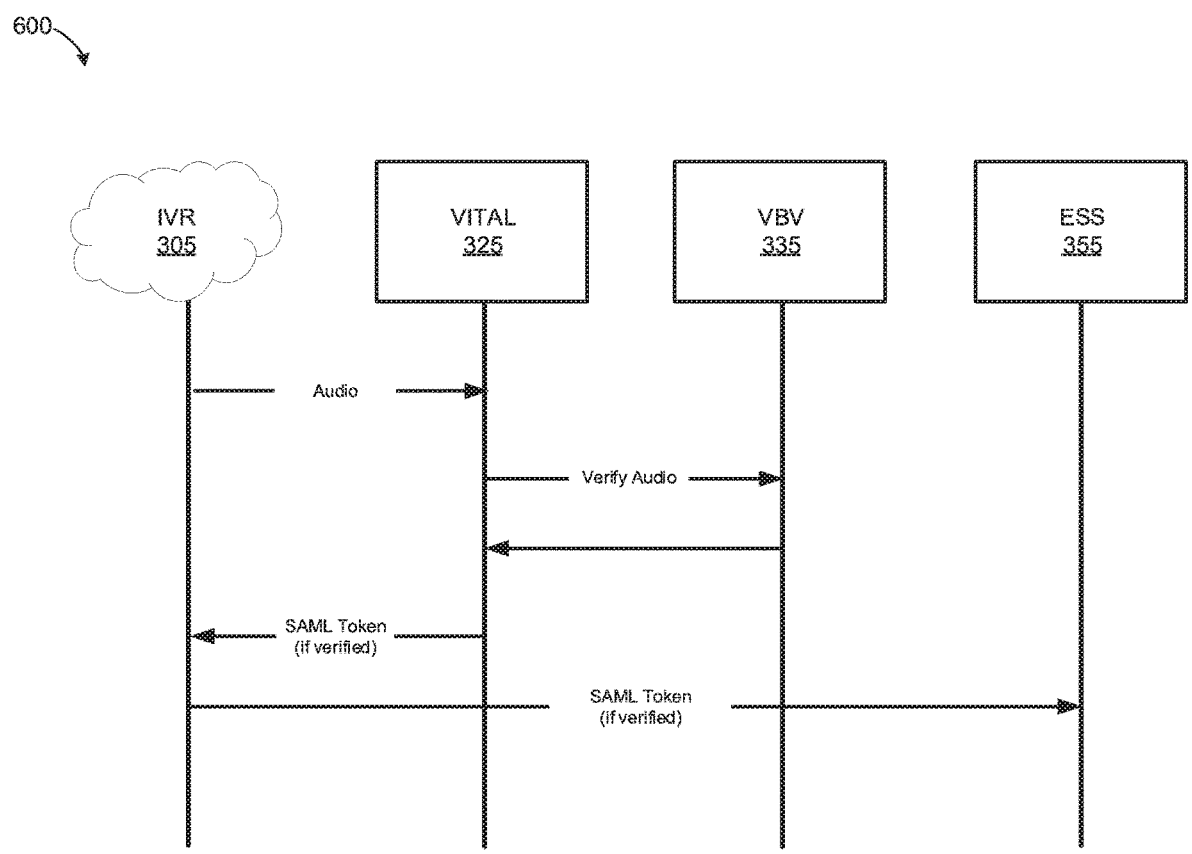
FIG. 6 is a diagram showing an exemplary process flow from an initial interaction between a registered user and an interactive voice response application, and delivery of a security token to an authentication application, according to embodiments of the technology described herein.

FIG. 6 is a diagram 600 showing an exemplary flow from an initial interaction between a voice activated device 250 and IVR 305, and delivery of a SAML token to ESS 355, using exemplary system 400. For example, after initiating a session, IVR 305 passes a spoken voice utterance to be verified to VITAL 325. VITAL 325 passes the processed spoken voice utterance to VBV 335 to determine if the utterance has a sufficient quality and length to compare with one or more voiceprints associated with the user. If the initial utterance is insufficient, VBV 335 returns an indicator to IVR 305 to begin collecting additional utterances. VITAL 325 then passes audio to the organization's VBV 335 which verifies whether there is a match to the caller's previously-collected voiceprints. If sufficient audio matches the caller's previously-collected voiceprints, VITAL 325 creates and returns a signed, encrypted SAML token, and the encrypted SAML token is returned to IVR 305. IVR 305 then passes the SAML token to ESS 355 in order for the User Identity Credential token to be upgraded to authenticated strength.

Figure 7:
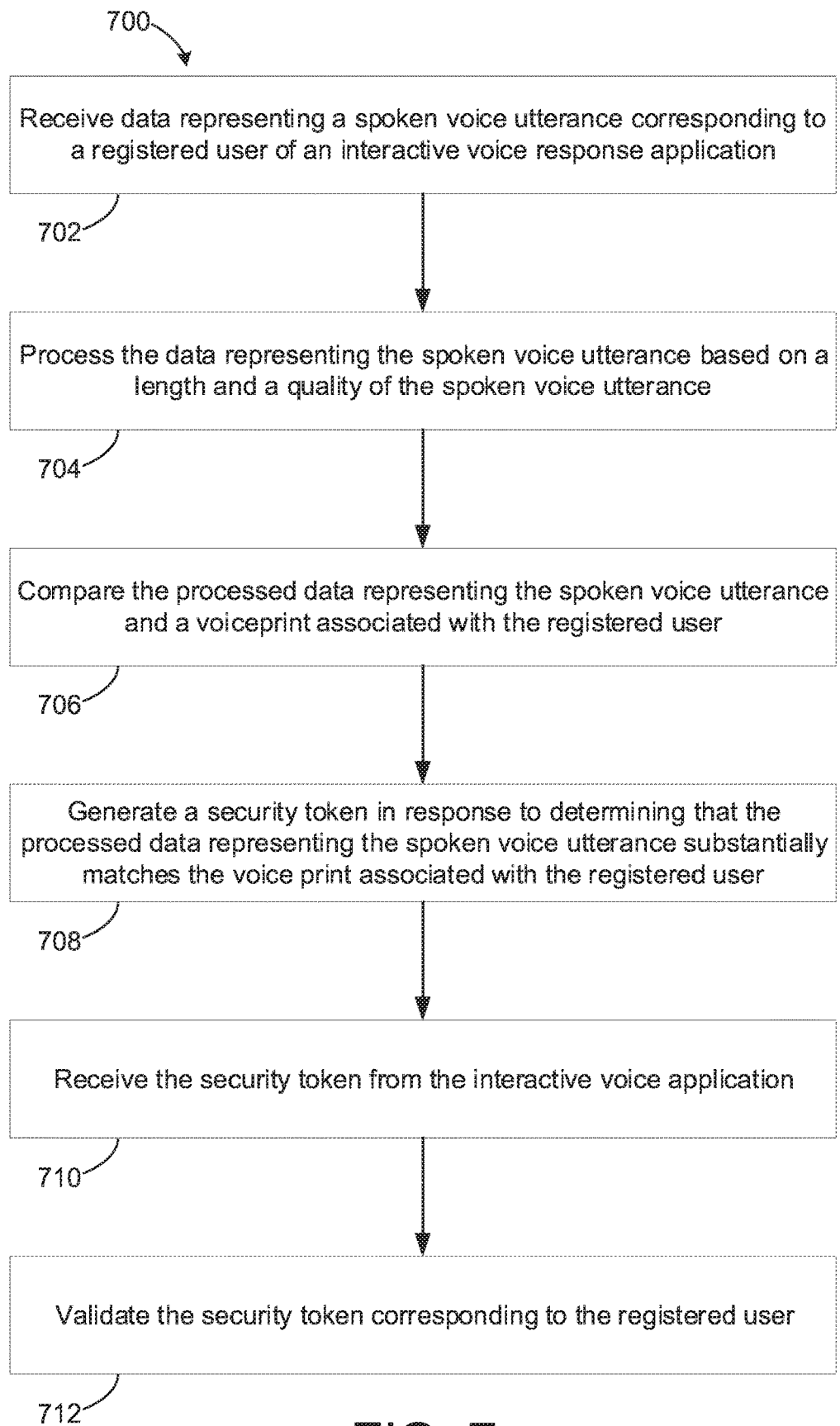
FIG. 7 is a flow diagram of a computer-implemented method for authenticating a registered user using an interactive voice response application, according to embodiments of the technology described herein.

Referring to FIG. 7, a process 700 for authenticating a registered user using an interactive voice response application 305. The process 700 begins by receiving data representing a spoken voice utterance corresponding to a registered user of an interactive voice response application 305 in step 702. In some embodiments, a first server computing device 200 receives the data representing the spoken voice utterance corresponding to the registered user. For example, in some embodiments, the first server computing device 200 includes VITAL 325, which is configured to receive the data representing the spoken voice utterance corresponding to the registered user. In some embodiments, the registered user is a caller or user of a voice activated device 250. In some embodiments, the voice activated device 250 can be a smartphone, a tablet, a personal computer, or a voice assistant device, or any other device capable of recording and processing the spoken voice utterance.

Process 700 continues processing the data representing the spoken voice utterance based on a length and a quality of the spoken voice utterance in step 704. In some embodiments, the first server computing device 200 processes the data representing the spoken voice utterance. For example, in some embodiments, the first server computing device 200 includes VITAL 325, which is configured to process the data representing the spoken voice utterance. In some embodiments, the first server computing device 200 can include a natural language understanding application. The natural language understanding application can be configured to process the spoken voice utterance based on the length and the quality of the spoken voice utterance.

Process 700 continues by comparing the processed data representing the spoken voice utterance and a voiceprint associated with the registered user in step 706. In some embodiments, a second server computing device 200 compares the processed data representing the spoken voice utterance and the voiceprint. For example, in some embodiments, the second server computing device 200 includes VBV 335, which is configured to compare the processed data representing the spoken voice utterance and the voiceprint. In some embodiments, the voiceprint associated with the registered user corresponds to previously generated spoken voice utterances. In other embodiments, comparing the processed data representing the spoken voice utterance and the voiceprint associated with the registered user includes determining allowances for deviation while applying a comparison algorithm.

Process 700 continues by generating a security token in response to determining that the processed data representing the spoken voice utterance substantially matches the voiceprint associated with the registered user in step 708. In some embodiments, the first server computing device 200 generates the security token in response to determining that the processed data representing the spoken voice utterance substantially matches the voiceprint associated with the registered user. For example, in some embodiments, the first server computing device includes VITAL 325, which is configured to generate the security token in response to determining that the processed data representing the spoken voice utterance substantially matches the voiceprint. In other embodiments, the first server computing device 200 is further configured to encrypt the security token with a certificate.

Process 700 continues by receiving the security token from the interactive voice application 305 in step 710. In some embodiments, a third server computing device 200 receives the security token from IVR 305. For example, in some embodiments, the third server computing device 200 includes ESS 355, which is configured to receive the security token from IVR 305. In other embodiments, if the security token is encrypted with a certificate, the third server computing device 200 is also configured to decrypt the security token and validate that the security token was encrypted with the certificate.

Process 700 finishes by validating the security token corresponding to the registered user in step 712. In some embodiments, the third server computing device 200 validates the security token corresponding to the registered user in response to determining that the security token matches a security token generated by the third server computing device 200. For example, in some embodiments, the third server computing device 200 includes ESS 355, which is configured to generate a security token and validate the security token received from IVR 305 in response to determining that the received security token matches the generated security token.

In some embodiments, the third server computing device 200 is also configured to update credentials corresponding to the registered user in response to validating the security token. For example, in some embodiments, the third server computing device 200 includes ESS 355, which is also configured to update credentials corresponding to the registered user in response to validating the security token. In some embodiments, IVR 305 is configured to receive the updated credentials corresponding to the registered user from ESS 355. Once IVR 305 receives the updated credentials corresponding to the registered user from ESS 555, subsequent security protected resources of IVR 305 are accessible to the registered user. For example, as discussed above in relation to FIGS. 5 and 6, IVR 305 can now provide security protected resources and information corresponding to the registered user. In some embodiments, the credentials are specific to and only comparable with IVR 305.

In some aspects, a system for authenticating a registered user using an interactive voice response application 305 includes an interactive voice response application 305 communicatively coupled to a first server computing device 200, a second server computing device 200, and a third server computing device 200. The first server computing device 200 is configured to receive data representing a spoken voice utterance corresponding to a registered user of the interactive voice response application 305. The first server computing device 200 is also configured to process the data representing the spoken voice utterance based on a length and a quality of the spoken voice utterance. Further, the first server computing device 200 is configured to generate the security token in response to determining that the processed data representing the spoken voice utterance substantially matches a voiceprint associated with the registered user. In some embodiments, the first server computing device 200 includes VITAL 325, which is configured to receive and process the data representing the spoken voice utterance corresponding to the registered user, and is also configured to generate the security token in response to determining that the processed data representing the spoken voice utterance substantially matches the voiceprint associated with the registered user.

Further, the second server computing device 200 is configured to compare the processed data representing the spoken voice utterance and the voiceprint associated with the registered user. In some embodiments, the second server computing device 200 includes VBV 335, which is configured to compare the processed data representing the spoken voice utterance and the voiceprint associated with the registered user. Further, the third server computing device 200 is configured to receive the security token from the interactive voice application 305. The third server computing device 200 is further configured to validate the security token corresponding to the registered user in response to determining that the security token matches a security token generated by the third server computing device 200. In some embodiments, the third server computing device 200 includes ESS 355, which is configured to receive and validate the security token corresponding to the registered user in response to determining that the security token received from IVR 305 matches a security token generated by ESS 355.

Figure 8:
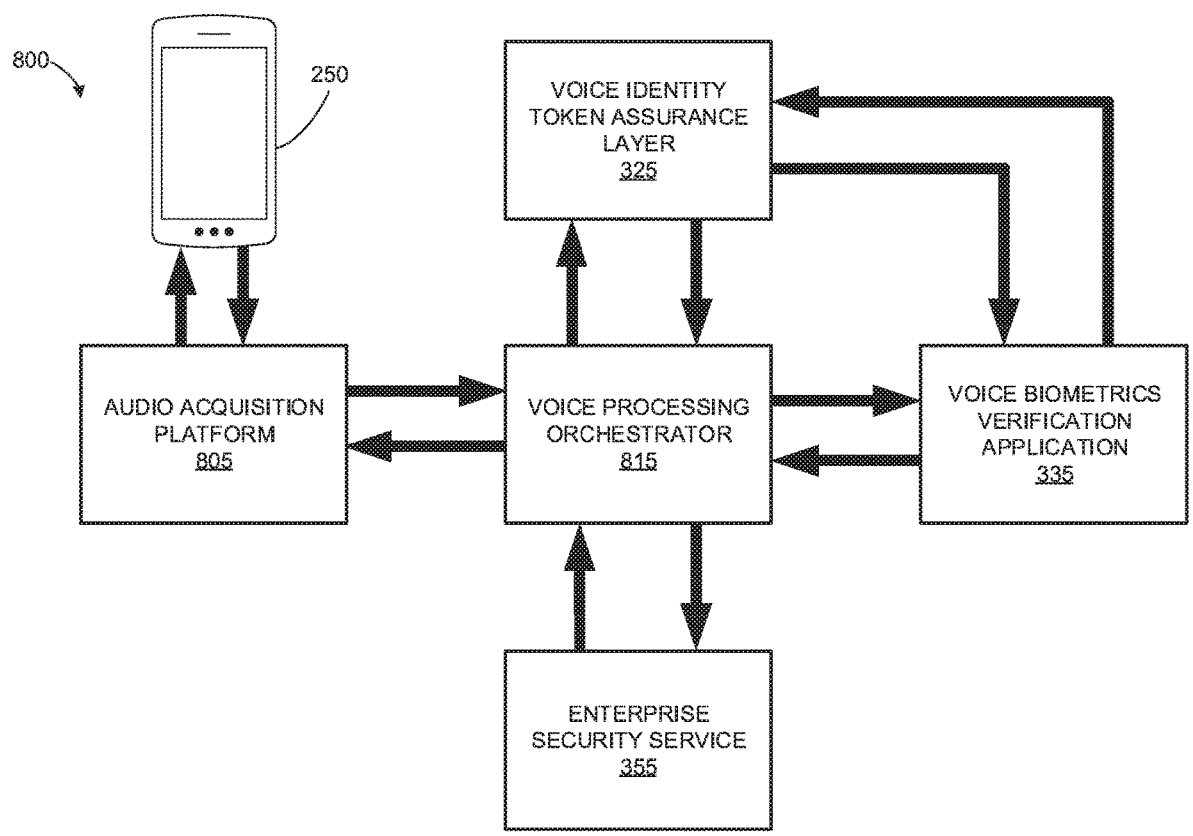
FIG. 8 is a block diagram of an exemplary system for authenticating a user over the exemplary data communications network shown in FIG. 1, according to embodiments of the technology described herein.

FIG. 8 is a block diagram of an exemplary system 800 for authenticating a user using a voice activated device 250 over the exemplary data communications network shown in FIG. 1. System 800 includes a voice activated device 250, an audio acquisition platform 805, a voice processing orchestrator 815, a voice identity token assurance layer 325, a voice biometrics verification application 335, and an enterprise security service 355. In some embodiments, the audio acquisition platform 805, voice processing orchestrator 815, voice identity token assurance layer 325, voice biometrics verification application 335, and enterprise security service 355 are all implemented on one or more server computing devices 200. In some embodiments, audio acquisition platform 805 and/or voice processing orchestrator 815 can be implemented using IVR 305. Voice processing orchestrator 815 (herein after "VPO 815") is an AI-powered API that orchestrates and optimizes audio captured by audio acquisition platform 805, and calculates the amount of audio needed to authenticate a user based on a calculated risk score.

System 800 facilitates the interaction between a user and a voice activated device 250 by providing the ability to take user audio from any voice activated device 250 (e.g., telephony, web, mobile, tablet, or smart speaker) with various levels of audio quality and compute it against a single master telephony voiceprint to verify the user using voice biometric capability in a single attempt. By avoiding multiple voice acquisitions, the use of additional bandwidth and friction between the user and the voice activated device 250 is reduced. System 800 provides a dynamic customer-based score that dictates the amount of audio needed at the $1^{st}$ touch point to successfully authenticate the user with a single attempt. In some embodiments, the dynamic score is computed in real-time based on channel type, customer speaking style, customer intent risk evaluation, and the users business risk profile. For example, the business risk profile can be based on customer historical data, fraud attempts, customer relationship, market fluctuations, geographic location, and calling device details.

Figure 9:
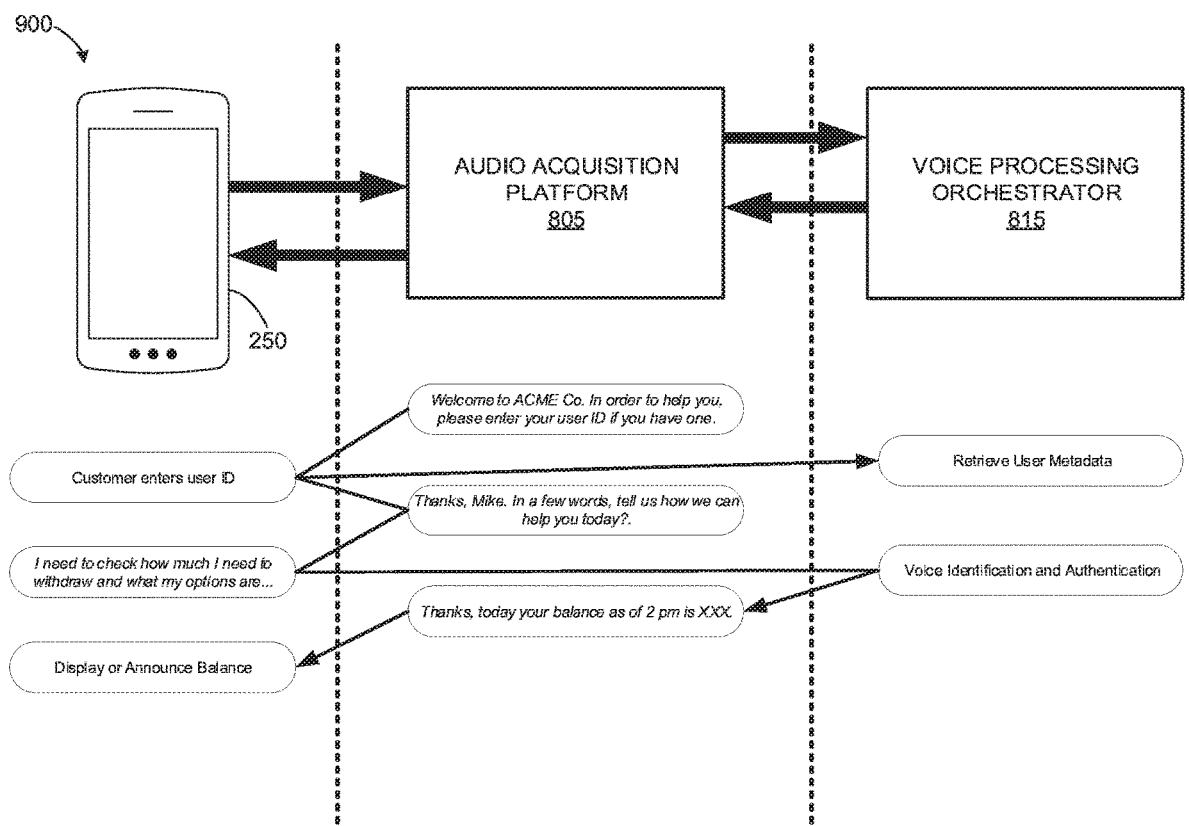
FIG. 9 is a diagram demonstrating an exemplary interaction between a registered user and a voice activated device, according to embodiments of the technology described herein.

For example, FIG. 9 is a flow diagram 900 showing an exemplary interaction between a voice activated device 250, audio acquisition platform 805, and voice processing orchestrator 815, using exemplary system 800. Generally, flow diagram 900 illustrates a use case for initial user authentication using VPO 815 where the caller provides sufficient audio to authenticate. The user is prompted to provide details about their intention in order to collect sufficient audio which will ultimately be authenticated or proven a non-match. Once the customer enters their user ID, VPO 815 can retrieve metadata corresponding to the user in order to calculate a risk score and a corresponding length of audio needed to authenticate the user. For example, VPO 815 can retrieve the customer's profile, geographic location, and calling device details.

In some embodiments, the risk score can be a numerical calculation that ranges from 1 to 10. A risk score of 1 can correspond to a customer with a low risk profile which requires a minimal number of words for authentication. A risk score of 10 can correspond to a customer with a high risk profile which requires a maximum number of words for authentication. For example, a risk score of 1 can correspond to a minimum of about one word, and a risk score of 10 can correspond to a maximum of about fifteen words. In some embodiments, the length of audio needed to authenticate the user can correspond to a range between about one second to about ten seconds.

Figure 10:
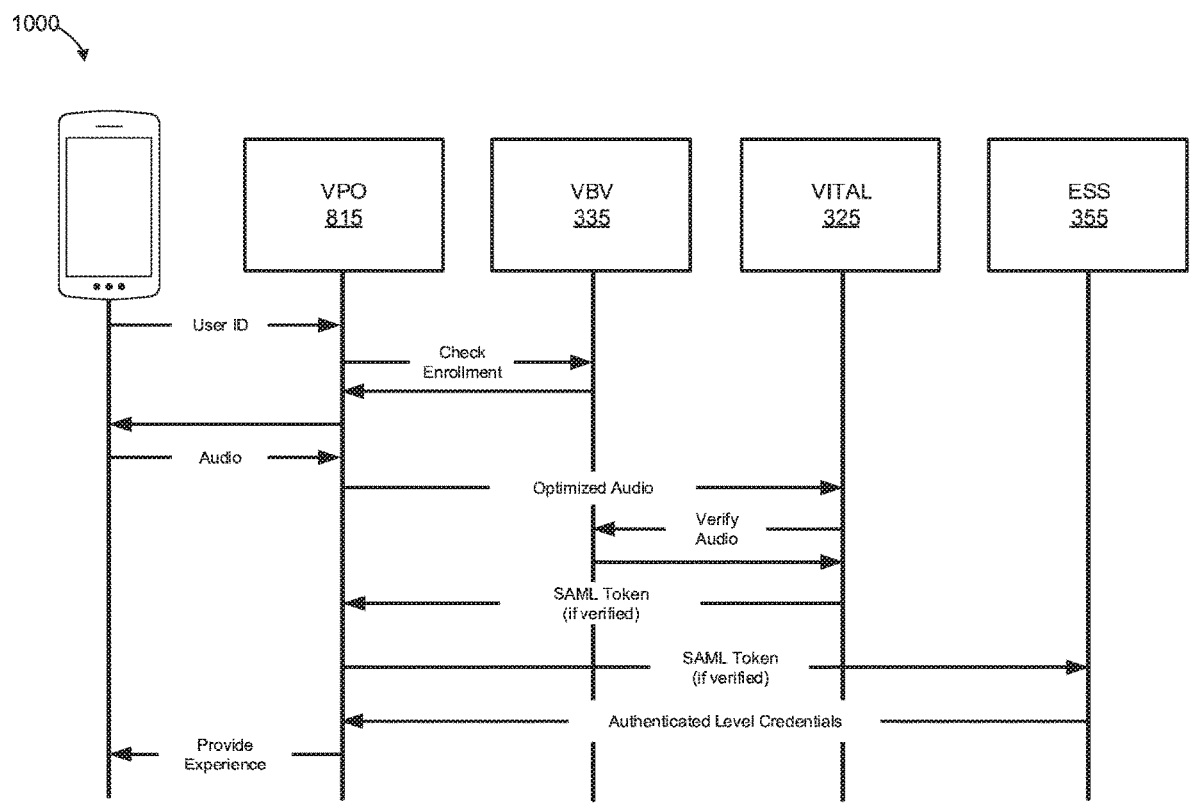
FIG. 10 is a diagram showing an exemplary process flow from an initial interaction between a registered user and an interactive voice response application using the exemplary system shown in FIG. 8, according to embodiments of the technology described herein.

FIG. 10 is a diagram 1000 showing an exemplary flow from an initial interaction between a voice activated device 250 and VPO 815 using exemplary system 800. A session is initiated at the voice activated device 250 when the user enters their user ID. After initiating the session, VPO 815 checks the enrollment status of the user with VBV 335. VBV 335 searches through the stored user voiceprints to check if there is a match. If there is a match, VBV 335 returns a match to VPO 815, indicating that the user is a registered or enrolled user. VPO 815 can then collect user metadata to calculate a risk score corresponding to the registered user. With the risk score, VPO 815 can use a rules engine to calculate the amount of audio needed and selects a corresponding experience announcement text to present to the user.

The voice activated device 250 can receive the experience announcement text and prompt the user to provide a spoken voice utterance of sufficient length. The voice activated device 250 then collects the spoken voice utterance using audio acquisition platform 805 and passes the spoken voice utterance to VPO 815. VPO 815 optimizes the spoken voice utterance in order to match the quality of the stored voiceprint. For example, VPO 815 can optimize the spoken voice utterance based on the device type of the voice activated device 250 and the quality of the voiceprint audio. VPO 815 then passes the spoken voice utterance to be verified to VITAL 325.

VITAL 325 passes the processed spoken voice utterance to VBV 335 to determine if the utterance has a sufficient quality and length to compare with one or more voiceprints associated with the user. If the initial utterance is insufficient, VBV 335 returns an indicator to VPO 815 to begin collecting additional utterances. VITAL 325 then passes audio to the organization's VBV 335 which verifies whether there is a match to the caller's previously-collected voiceprints. If sufficient audio matches the caller's previously-collected voiceprints, VITAL 325 creates and returns a signed, encrypted SAML token, and the encrypted SAML token is returned to VPO 815. VPO 815 then passes the SAML token to ESS 355 in order for the User Identity Credential token to be upgraded to authenticated strength. Once the User Identity Credential token is upgraded by ESS 355, ESS 355 returns authenticated level credentials to VPO 815. VPO 815 then determines the best experience flow and communicates the flow to the voice activated device 250.

Figure 11:
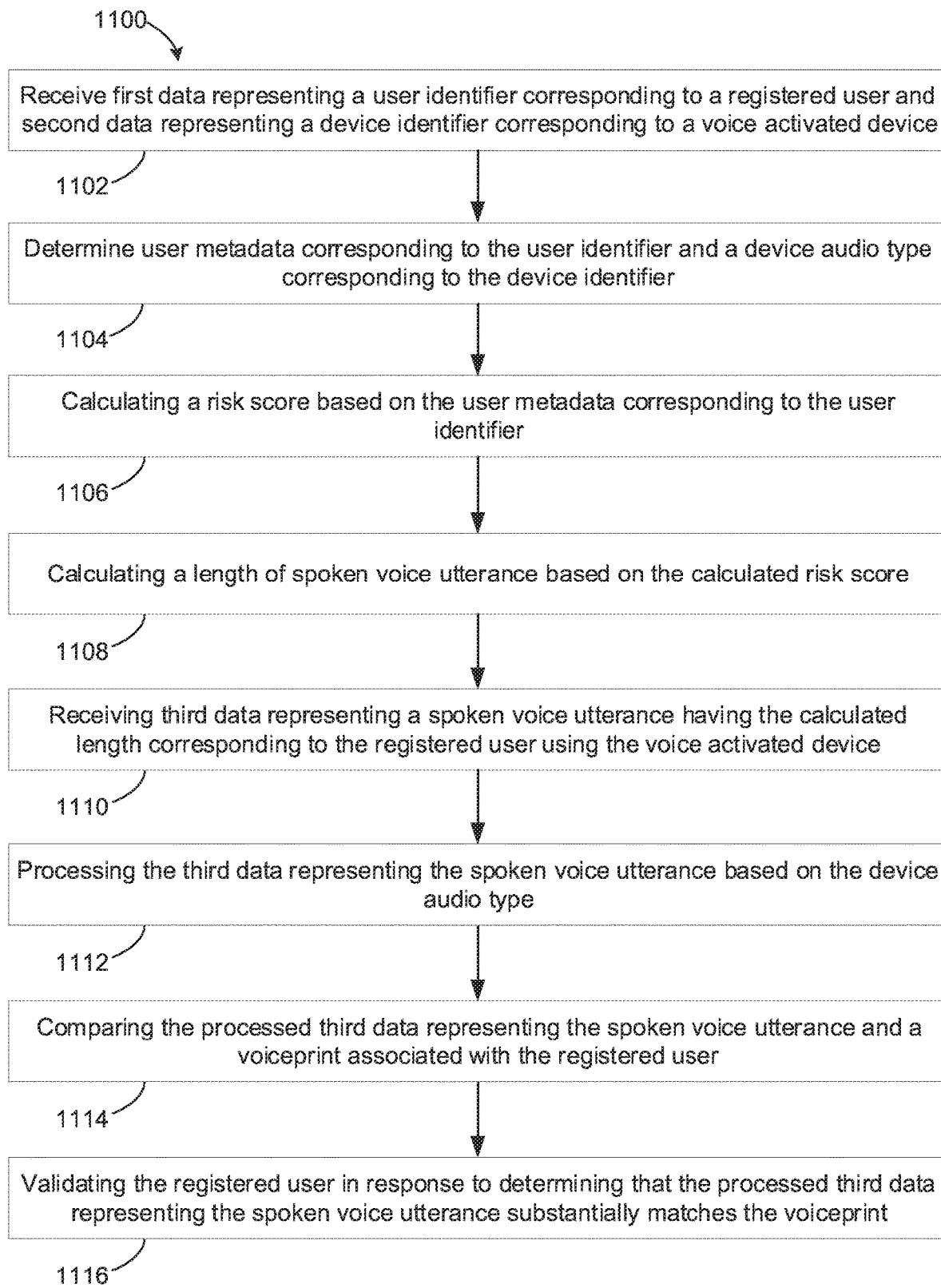
FIG. 11 is a flow diagram of a computer-implemented method for authenticating a registered user using an interactive voice response application on a voice activated device, according to embodiments of the technology described herein.

Referring to FIG. 11, a process 1100 for authenticating a registered user using a voice activated device 250. The process 1100 begins by receiving first data representing a user identifier corresponding to a registered user and second data representing a device identifier corresponding to a voice activated device 250 in step 1102. In some embodiments, a server computing device 200 receives the first data representing the user identifier corresponding to the registered user and second data representing the device identifier corresponding to the voice activated device 250. For example, in some embodiments, the server computing device 200 includes VPO 815, which is configured to receive the first data representing the user identifier corresponding to the registered user and second data representing the device identifier corresponding to the voice activated device 250. In some embodiments, audio acquisition platform 805 and/or VPO 815 can be implemented using IVR 305. In some embodiments, the voice activated device 250 can be a smartphone, a tablet, a laptop, a personal computer, or a voice assistant device, or any other device capable of recording and processing the spoken voice utterance.

Process 1100 continues by determining user metadata corresponding to the user identifier and a device audio type corresponding to the device identifier in step 1104. In some embodiments, the server computing device 200 determines user metadata corresponding to the user identifier and the device audio type corresponding to the device identifier. For example, in some embodiments, the server computing device 200 includes VPO 815, which is configured to determine user metadata corresponding to the user identifier and the device audio type corresponding to the device identifier. In some embodiments, the server computing device 200 is further configured to receive a user location from the voice activated device 250. In some embodiments, the user metadata includes at least one of a user speaking style, a user intention, or user historical data.

Process 1100 continues by calculating a risk score based on the user metadata corresponding to the user identifier in step 1106. In some embodiments, the server computing device 200 calculates the risk score based on the user metadata corresponding to the user identifier. For example, in some embodiments, the server computing device 200 includes VPO 815, which is configured to calculate the risk score based on the user metadata corresponding to the user identifier. In some embodiments, the risk score is computed in real-time based on channel type, customer speaking style, customer intent risk evaluation, and the users business risk profile. In some embodiments, the server computing device 200 is further configured to calculate the risk score based on the user location.

Process 1100 continues by calculating a length of spoken voice utterance based on the calculated risk score in step 1108. In some embodiments, the server computing device 200 calculates the length of spoken voice utterance based on the calculated risk score. For example, in some embodiments, the server computing device 200 includes VPO 815, which is configured to calculate the length of spoken voice utterance based on the calculated risk score. In some embodiments, the length of spoken voice utterance ranges from three to five words. In other embodiments, the length of spoken voice utterance ranges from five to ten words. In some embodiments, the length of spoken voice utterance is calculated from the length and/or quality of a voiceprint corresponding to the registered user.

Process 1100 continues by receiving third data representing a spoken voice utterance having the calculated length corresponding to the registered user using the voice activated device 250 in step 1110. In some embodiments, the server computing device 200 receives the third data representing the spoken voice utterance having the calculated length. For example, in some embodiments, the server computing device 200 includes VPO 815, which is configured to receive the third data representing the spoken voice utterance having the calculated length. In some embodiments, the received spoken voice utterance includes a user intention. The user intention can be used by VPO 815 to determine an experience flow the user intended when initiating the interaction with the voice activated device 250. In some embodiments, the server computing device 200 is further configured to determine the experience flow based on the user intention.

Process 1100 continues by processing the third data representing the spoken voice utterance based on the device audio type in step 1112. In some embodiments, the server computing device 200 processes the third data representing the spoken voice utterance. For example, in some embodiments, the server computing device 200 includes VPO 815, which is configured to process the third data representing the spoken voice utterance. For example, VPO 815 can optimize the spoken voice utterance in order to match the quality of the stored voiceprint. In some embodiments, VPO 815 can optimize the spoken voice utterance based on the device type of the voice activated device 250 and the quality of the voiceprint audio.

Process 1100 continues by comparing the processed third data representing the spoken voice utterance and a voiceprint associated with the registered user in step 1114. In some embodiments, the server computing device 200 compares the processed third data representing the spoken voice utterance and the voiceprint. For example, in some embodiments, the server computing device 200 includes VBV 335, which is configured to compare the processed data representing the spoken voice utterance and the voiceprint. In some embodiments, the voiceprint associated with the registered user corresponds to previously generated spoken voice utterances. In some embodiments, the voiceprint has a length ranging from about thirty to sixty seconds.

Process 1100 finishes by validating the registered user in response to determining that the processed third data representing the spoken voice utterance substantially matches the voiceprint associated with the registered user in step 1116. In some embodiments, the server computing device 200 validates the registered user in response to determining that the processed third data matches the voiceprint. For example, in some embodiments, the server computing device includes VITAL 325, which is configured to generate a security token in response to determining that the processed third data representing the spoken voice utterance substantially matches the voiceprint. In other embodiments, the server computing device 200 includes VPO 815, which is configured to encrypt the security token with a certificate. In some embodiments, the server computing device 200 includes ESS 355, which is configured to decrypt the security token and generate authenticated level credentials to be used by VPO 815 to provide the experience flow. Once VPO 815 receives the updated credentials corresponding to the registered user from ESS 555, subsequent security protected resources of VPO 815 are accessible to the registered user. For example, VPO 815 can now provide security protected resources and information corresponding to the registered user.

In some aspects, a system for authenticating a registered user using a voice activated device 250 communicatively coupled to a server computing device 200. The server computing device 200 is configured to receive first data representing a user identifier corresponding to the voice activated device 250. The server computing device 200 is also configured to determine user metadata corresponding to the user identifier and a device audio type corresponding to the device identifier. Further, the server computing device 200 is configured to calculate a risk score based on the user metadata corresponding to the user identifier. The server computing device 200 is also configured to calculate a length of spoken voice utterance based on the calculated risk score.

Further, the server computing device 200 is configured to receive third data representing a spoken voice utterance having the calculated length corresponding to the registered user using the voice activated device 250. The server computing device 200 is also configured to process the third data representing the spoken voice utterance based on the device audio type. Further, the server computing device 200 is configured to compare the processed third data representing the spoken voice utterance and a voiceprint associated with the registered user. The server computing device 200 is also configured to validate the registered user in response to determining that the processed third data representing the spoken voice utterance substantially matches the voiceprint associated with the registered user.

The embodiments described in relation to FIGS. 8-11 provide network administrators with systems and methods for authenticating a registered user using a voice activated device over communication networks. For example, a network administrator can provide a customer with a voice activated device 250. The customer can enter their user ID into a user interface of the voice activated device 250. VPO 815 can then retrieve user metadata, such as device type, user location, and user profile, and run dynamic calculations to determine a risk score. VPO 815 can use a rules engine to calculate the risk score and determine an amount of audio needed to authenticate the customer. VPO 815 can then select a corresponding experience announcement text and send the test to the voice activated device 250. Using the audio acquisition platform 805 on the voice activated device 250, the customer states their need in the form of audio. VPO 815 can then optimize the audio and authenticate the customer using VBV 335, VITAL 325, and ESS 355. Once authenticated, VPO 815 can provide a user experience corresponding to the customer's stated need. If needed, VPO 815 can route the call to a live representative to resolve the customer's stated need.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A method for authenticating a registered user using a voice activated device, the method comprising:

establishing, by a server computing device, a session with a voice activated device operated by a user, including generating a session level credential token;

determining, by the server computing device, that a voiceprint has been registered to the user based upon identity information provided by the user;

upgrading, by the server computing device, an authentication level of the session level credential token and identifying the user as a registered user upon determining that a voiceprint has been registered to the user;

receiving, by the server computing device, first data representing a user identifier corresponding to the registered user and second data representing a device identifier corresponding to the voice activated device;

determining, by the server computing device, user metadata corresponding to the user identifier and a device audio type corresponding to the device identifier, wherein the user metadata comprises a user speaking style and the device audio type corresponds to audio received from one of a smartphone, a tablet, a laptop, a personal computer, or a voice assistant device;

calculating, by the server computing device, a risk score based on the user metadata corresponding to the user identifier;

calculating, by the server computing device, a length of spoken voice utterance based on the calculated risk score;

receiving, by the server computing device, third data representing a spoken voice utterance having the calculated length corresponding to the registered user using the voice activated device;

processing, by the server computing device, the third data representing the spoken voice utterance based on the device audio type;

comparing, by the server computing device, the processed third data representing the spoken voice utterance and a voiceprint associated with the registered user; and validating the registered user in response to determining that the processed third data representing the spoken voice utterance matches the voiceprint associated with the registered user, comprising:

creating, by the server computing device, a signed, encrypted security token based upon matching the processed third data to the voiceprint associated with the registered user, providing, by the server computing device, the security token and the session level credential token to an authentication service, validating, by the authentication service, the security token, upgrading, by the authentication service, the authentication level of the session level credential token upon validating the security token, and transmitting, by the authentication service, the upgraded session level credential token to the server computing device.

2. The method of claim 1, wherein the server computing device is further configured to receive a user location from the voice activated device.

3. The method of claim 2, wherein the server computing device is further configured to calculate the risk score based on the user location.

4. The method of claim 1, wherein the user metadata further comprises at least one of a user intention or user historical data.

5. The method of claim 1, wherein the spoken voice utterance comprises a user intention.

6. The method of claim 5, wherein the server computing device is further configured to determine an experience flow based on the user intention.

7. The method of claim 1, wherein the voiceprint associated with the registered user corresponds to previously generated spoken voice utterances.

8. The method of claim 1, wherein the server computing device is further configured to generate a security token in response to determining that the processed third data representing the spoken voice utterance substantially matches the at least one voiceprint associated with the registered user.

9. The method of claim 8, wherein the server computing device is further configured to encrypt the security token with a certificate.

10. A system for authenticating a registered user using a voice activated device, the system comprising:

a voice activated device communicatively coupled to a server computing device, the server computing device configured to:
  establish a session with a voice activated device operated by a user, including generating a session level credential token;
  determine that a voiceprint has been registered to the user based upon identity information provided by the user;
  upgrade an authentication level of the session level credential token and identifying the user as a registered user upon determining that a voiceprint has been registered to the user;
  receive first data representing a user identifier corresponding to the registered user and second data representing a device identifier corresponding to the voice activated device;
  determine user metadata corresponding to the user identifier and a device audio type corresponding to the device identifier, wherein the user metadata comprises a user speaking style and the device audio type corresponds to audio received from one of a smartphone, a tablet, a laptop, a personal computer, or a voice assistant device;
  calculate a risk score based on the user metadata corresponding to the user identifier;
  calculate a length of spoken voice utterance based on the calculated risk score;
  receive third data representing a spoken voice utterance having the calculated length corresponding to the registered user using the voice activated device;
  process the third data representing the spoken voice utterance based on the device audio type;
  compare the processed third data representing the spoken voice utterance and a voiceprint associated with the registered user; and
  validate the registered user in response to determining that the processed third data representing the spoken voice utterance matches the voiceprint associated with the registered user, comprising:
    creating a signed, encrypted security token based upon matching the processed third data to the voiceprint associated with the registered user,
    providing the security token and the session level credential token to an authentication service,
    validating, by the authentication service, the security token,
    upgrading, by the authentication service, the authentication level of the session level credential token upon validating the security token, and
    transmitting, by the authentication service, the upgraded session level credential token to the server computing device.

11. The system of claim 10, wherein the server computing device is further configured to receive a user location from the voice activated device.

12. The system of claim 11, wherein the server computing device is further configured to calculate the risk score based on the user location.

13. The system of claim 10, wherein the user metadata further comprises at least one of a user intention or user historical data.

14. The system of claim 10, wherein the spoken voice utterance comprises a user intention.

15. The system of claim 14, wherein the server computing device is further configured to determine an experience flow based on the user intention.

16. The system of claim 10, wherein the at least one voiceprint associated with the registered user corresponds to previously generated spoken voice utterances.

17. The system of claim 10, wherein the server computing device is further configured to generate a security token in response to determining that the processed third data representing the spoken voice utterance substantially matches the at least one voiceprint associated with the registered user.

18. The system of claim 17, wherein the server computing device is further configured to encrypt the security token with a certificate.

19. The method of claim 1, wherein the voice activated device comprises a voice assistant device.

20. The system of claim 10, wherein the voice activated device comprises a voice assistant device.

21. A method for authenticating a registered user using a voice activated device, the method comprising:

establishing, by a server computing device, a session with a voice activated device operated by a user, including generating a session level credential token;

upgrading, by the server computing device, an authentication level of the session level credential token and identifying the user as a registered user upon determining that a voiceprint has been registered to the user;

determining, by the server computing device, user metadata corresponding to a user identifier corresponding to the registered user and a device audio type corresponding to a device identifier of the voice activated device determining, by the server computing device, a length of spoken voice utterance based on a risk score calculated from the user metadata;

processing, by the server computing device based on the device audio type, third data representing a spoken voice utterance of the registered user and having the calculated length, as received from the voice activated device;

determining, by the server computing device, the processed third data matches a voiceprint associated with the registered user;

creating, by the server computing device, a signed, encrypted security token upon determining the processed third data matches the voiceprint;

providing, by the server computing device, the security token and the session level credential token to an authentication service;

upgrading, by the authentication service, the authentication level of the session level credential token upon validating the security token, and transmitting, by the authentication service, the upgraded session level credential token to the server computing device.

\* \* \* \* \*